April 4, 1933. A. ORNBERG 1,903,314
WINDSHIELD HEATER
Filed Jan. 20, 1930
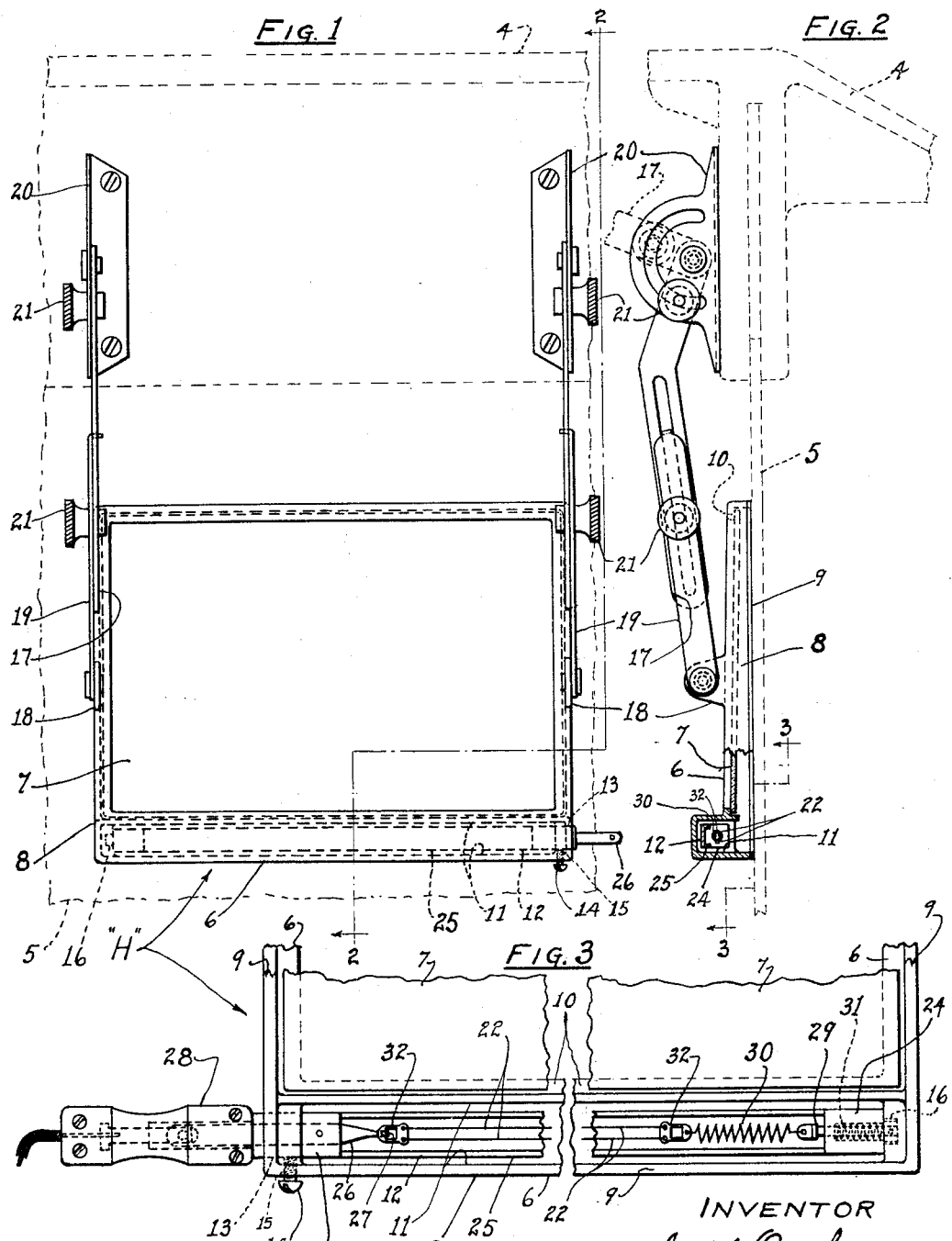

Patented Apr. 4, 1933

1,903,314

UNITED STATES PATENT OFFICE

ARVID ORNBERG, OF CHICAGO, ILLINOIS

WINDSHIELD HEATER

Application filed January 20, 1930. Serial No. 422,026.

This invention relates in general to means for heating wind shields to prevent snow and ice from gathering on the windshield, but more particularly it has reference to wind shield heaters wherein the window pane, which forms a portion of the heater is adapted to stand at a slight angle with the pane of a wind shield when the heater is arranged against the wind shield pane; and, wherein, the heat from the heating element is confined between the pane of a windshield and the window pane of the heater when the heater is arranged against a wind shield pane.

An important object of my invention contemplates the provision of a device which, provides for heating of the window pane of a wind shield to prevent snow and ice from gathering on the wind shield, when the same is arranged against the window pane of a wind shield, and to assure the working of the wind shield wiper.

Another important object of the invention contemplates the provision of a wind shield heater comprising a rectangular frame having a recessed opening for a window pane and recessed to provide a pocket for an electric heating unit which may be easily replaced at any time, should it become broken or out of order, simply by releasing a set screw, which holds it in place, and draw it out from the pocket.

A further important object of the invention contemplates the provision of a combined window and wind shield heater which, when arranged against the window pane of a wind shield, will provide a means for confining the heat from an electric heating unit within the device when adjacent a wind shield window pane, and which, also provides a means whereby the view in front of the operator of an automobile, or a traveling vehicle, may be easily viewed through the said device when arranged before him.

Further, an important object contemplated in this invention provides a combined window and wind shield heater which will be very effective, when in use against a wind shield, in preventing ice and snow from gathering on the wind shield in front of the operator and at the place where the wind shield wiper operates.

A further object of the invention contemplates the provision of a combined window and wind shield heater which will be of neat and pleasing design, simple of construction, and which may be produced at, comparatively, a very small cost.

A further object of my improvements provides a device of the character above described which may be readily placed in an operative, or an inoperative, position simply by swinging it from one position to that of its other position and locking it in the position desired.

A still further object of my improvements provides for readily placing the heating unit in circuit with an electric current by simply attaching a removable socket onto a prong or extension of the heating unit in the heater. The circuit being formed through connecting wires leading from a source of electricity to said socket and through the metallic connection made by the frame of an automobile, or such other vehicle, to which the device may be fastened.

These and other objects of the improvements embodied in my invention will be better understood by referring to the accompanying drawing, and will be more fully described in the following specification, and more particularly pointed out in the appended claims.

In the several views illustrated in the drawing;

Fig. 1 is a view of the device containing my improvements as installed in an automobile in its operative position against the window pane of wind shield; a portion of the automobile frame and wind shield being shown in light dotted lines;

Fig. 2 is a sectional view taken on the plane 2—2 of Fig. 1; the light dotted lines of heater bracket arms indicate their position when heater is in an inoperative or out-of-the-way position; and, Fig. 3 is a view (approximately full size) seen from the plane 3—3 and shows the manner the heating unit is installed in the pocket as provided in the heater frame, and shows, also, the electric socket as attached to the prong or extension of the heating unit in its one end, and the manner of making electric connection to the heater frame at its opposite end. The greater portion of the heater frame being broken away and not shown. The heating unit may comprise, one, two or more, heating elements. Two being shown in this case.

Similar characters refer to similar parts throughout the several views.

As illustrated in the drawing, I have shown the invention, indicated, generally, by the reference character "H", installed in the upper front corner of what may be an automobile which is shown in light dotted lines indicated by 4, and arranged against the inside surface of a wind shield window pane 5, in its operative position, which is normally in front of the operator and opposite the place where a wind shield wiper operates during the time a car or automobile is traveling through a snow storm, and when it is sufficiently cold to form frost or ice on the wind shield, and, when the temperature of the atmosphere is such that the moisture in the air would accumulate upon the wind shield pane 5.

Referring to Fig. 1, and particularly to Fig. 2, it will be seen that when the device "H", is arranged, in this, or its operative position, against the window pane 5, it, together with pane 5, forms an enclosure and confines the air within the space enclosed by the pane 5, and the heater frame 6, and its window pane 7. In Fig. 2, it will be seen that the pane 7, is arranged to be at a slight angle with pane 5. This arrangement facilitates the air within the enclosure being at a uniform temperature when heater 8, is in operation.

Around the face edge of frame 6, is provided, and fastened by gluing, a resilient strip of material such as asbestos, or felt, 9, to act as a cushion against the wind shield when the heater "H" is in its operating position.

In Figures 2 and 3, it will be seen that the frame 6, is recessed to form a ledge 10, where the pane 7, is arranged and fastened in place by gluing. Also, it will be seen that frame 6, is provided with a longitudinal pocket, or recess, 11, into which, is inserted an electric heater unit 12, through an opening 13, provided in the wall at one end of the pocket 11. The unit 12, being fastened in place by means of set screw 14, as is indicated at 15. In the wall of pocket 11, and opposite to opening 13, is provided a small opening 16, into which is inserted a terminal, of heater unit 12, which provides an electrical connection by way of frame 6, and hingeable heater brackets 17, and through the metal frame of the vehicle upon which the heater may be installed.

Lugs 18, are provided on frame 6, to which are hingeably secured extendable hinged bracket arms 19; and they, in turn, are adjustably secured in bracket members 20. The operative, or inoperative, adjustment of the heater being secured by means of thumb nuts, or screws 21. The members 20, may be fastened vertically, as shown, or, horizontally, as the case may require. The bracket arms 19, being extendable permit of arranging the heater in various vertical positions upon the wind shield 5.

The construction of heater unit 12, provides a heater, which may be produced at, comparatively, a small cost; and one that may be quickly installed in the heater frame 6, or removed therefrom for the renewal of any broken or burned out heating elements 22. Provision is also made for easily attaching, or, detaching, heating elements, and for keeping them taut, whether they be cold or heated. Terminal blocks, 23 and 24, are provided at opposite ends of a connecting bar 25; they being formed or moulded together from some insulating material, which will withstand heat, and, when moulded, provision is made to include electrical connection terminals in both blocks 23 and 24. The terminal in block 23, comprises a flat copper strip 26, which extends out from both ends of the block. The inner end being provided with a loop, or hook 27, to which one end of the heating element may be fastened. The opposite end of strip 26, extends out from the end of block 23, far enough to permit of attaching an electrical connection socket 28. In the opposite block 24, provision is made to include an electrical connection terminal 29, which is provided with tension members 30 and 31. When inserting heater unit, 12, in place, tension member 31 forces 29 to make contact with the frame 6, in the opening 16, provided therefor. The member 30, provides means for fastening the other end of said heating element, and, as before stated, keeping it taut in either its cold or hot condition.

In the present instance two electrical resistance wires are employed and are arranged in parallel relation with each other and spaced a small distance apart, their respective opposite ends being fastened to attachment members 32, to form a sub-unit or heating element 22.

The heating elements thus constructed form, as stated, a sub-unit which may be readily assembled or disassembled for renewal at any time.

A wind shield heater constructed along the lines above described provide an efficient means to keep a wind shield sufficiently hot under the most severe weather conditions at all times, because the heat confined between the heater and the wind shield cannot escape except by radiation through the medium of the wind shield. And, for that reason, the wind shield is always kept at a proper temperature to assure it of being kept free from ice, snow, and frost, especially where the wind shield wiper is operating to keep the wind shield clear so that the view through it may be plainly seen when traveling through a snow storm and inclement weather.

Having thus described my invention it may be readily understood that the minor details of my construction may be altered in several ways without departing from the spirit and scope of my invention. Therefore, what I claim is desired to be secured by Letters Patent.

I claim:

1. A heater, of the character described, comprising the combination of a recessed window frame and a window pane therefor with a detachable heater unit having a series of removable strands of electrical resistance wires being supported in a frame comprising a portion of said heater unit, an opening and an opposite recess and a pocket in said frame in which to removably support said unit, means for adjustably supporting said window frame and unit into, and out of, operative relation with a windshield pane, said means comprising a pair of brackets each having an arcuate slot, a bent arm hingeably mounted in each of said brackets, an extendable arm for carrying said window frame adjustably secured to each of said bent arms, and means for clamping said arms in various positions and rigidly to said brackets, substantially as described and for the purpose specified.

2. A heater of the character described comprising the combination, of a heating device having detachable electrical heating units, a recessed window frame providing a frame for enclosing said device, a window pane in said recessed frame, a pocket in said frame, an opening through a side of said frame and communicating with said pocket, said unit being adapted to be inserted through said opening and into said pocket, means for removably securing said device in place, and means for automatically making an electrical connection with said units and said frame on inserting said device in place and to form a portion of an electric circuit.

3. A heater of the character described comprising, in combination; a recessed window frame having a window pane therein, and providing a housing for a removable electrical heater, a pocket in said frame, an opening in a side of said frame and communicating with said pocket, said heater comprising a frame having detachable heating units comprising strands of electrical resistance wires, said heater being adapted to be inserted through said opening and into said pocket, means for removably securing said heater in said opening, and means for automatically making a portion of an electric circuit with said heater and said housing on securing said heater in place.

4. A heater of the character described comprising the combination of a recessed window frame having a window therein with a removable electrical heating unit having an arrangement of detachably secured strands of electrical resistance wires, said wires being arranged in parallel relation with each other and spaced one above the other adjacent to and parallel with the window pane of a wind shield, an opening through a side of said recessed frame, a pocket in said frame, said opening communicating with said pocket, a small opening or recess formed in the side opposite said opening, and said unit being adapted to be removably secured through said opening and into said pocket and automatically form an electrical connection with said frame in the said small opening.

ARVID ORNBERG.